Dec. 13, 1955  C. W. VOGT  2,726,784
METHOD OF FORMING TAPE CUTTING MECHANISM AND RESULTING PRODUCT
Filed Sept. 19, 1952
FIG. 1.
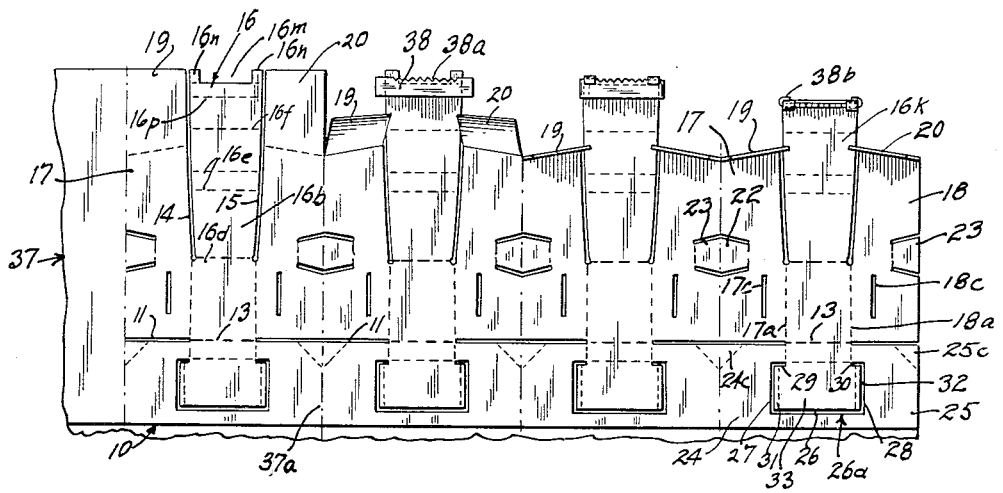
FIG. 2.
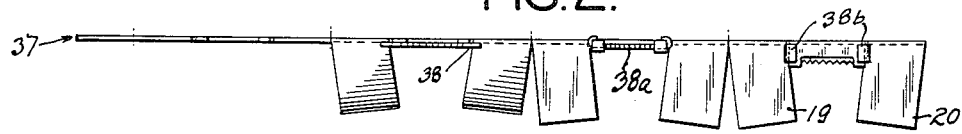
FIG. 3.
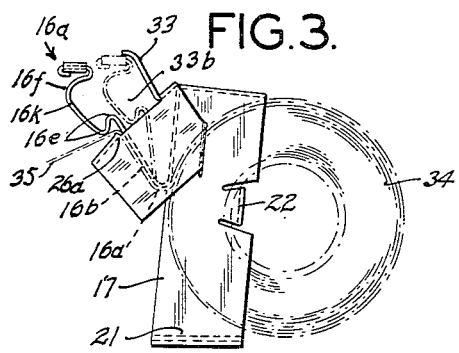
FIG. 4.
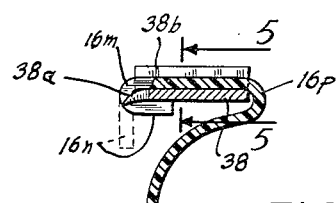
FIG. 6.
FIG. 5.
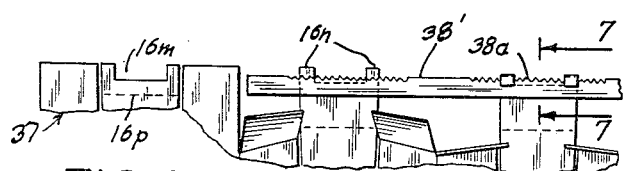
FIG. 7.
INVENTOR.
CLARENCE W. VOGT
BY
his ATTORNEYS

United States Patent Office

2,726,784
Patented Dec. 13, 1955

2,726,784

METHOD OF FORMING TAPE CUTTING MECHA-NISM AND RESULTING PRODUCT

Clarence W. Vogt, Norwalk, Conn.

Application September 19, 1952, Serial No. 310,381

6 Claims. (Cl. 216—33)

The present invention relates to tape holding, dispensing and cutting mechanisms and to methods of manufacturing the same, and embodies more specifically an improved device and method by means of which the tape cutting or severing element of such mechanisms may be conveniently and effectively manufactured.

In applicant's co-pending application Serial No. 307,795, filed September 4, 1952, for "Tape Holder with Snubber and Cutter Tongue" there is described an improved form of tape holding, applying and cutting mechanism by means of which, by simple forming operations, devices of the above character may be formed out of blanks of suitable material, such as for example, sheet metal and plastic material. The present invention embodies an improvement in the cutting mechanism of the aforesaid co-pending application as well as in the method of manufacturing the same, and an object of this invention is to provide a cutting mechanism and method of manufacturing by means of which the tape severing or cutting element to be embodied in the holder and tape applying mechanism may be formed preferably in a continuous operation in which blank material and a cutting element may be brought together and secured in such fashion that the subsequent holder forming operations may then be performed conveniently to provide an inexpensive and effective tape holding, applying and cutting mechanism.

The foregoing and other objects will be apparent as the invention is described in further detail in connection with the accompanying drawings, wherein Figure 1 is a plan view showing the manner in which cutting material and holder-forming blank material may be brought together and secured in operative relationship in accordance with the present invention;

Figure 2 is a view in side elevation looking at the edge of Figure 1 and showing the result of some of the forming operations;

Figure 3 is a view in side elevation showing a tape holder, applier and cutting mechanism constructed in accordance with the present invention;

Figure 4 is a partial view in transverse section, somewhat enlarged, and showing the cutting mechanism of the present invention in its operative position;

Figure 5 is a section through the cutting mechanism as seen along the line 5—5 of Figure 4;

Figure 6 is a fragmentary view of the upper edge of the blank 10 showing a modified way of applying the cutting element; and Figure 7 is an enlarged cross-section therethrough as seen along the line 7—7 of Figure 6.

Before the forming operations are described, the individual blank structure and the resulting article made therefrom will first be explained. Referring to Figure 1, the right-hand portion of the material being supplied is illustrated as a completed blank ready for the further manufacturing operations, as a result of which the article of Figure 3 is produced. This blank is shown at 10 as being provided with transverse cuts 11 (the slots in Figure 1 indicate cuts, whereas the dotted lines indicate fold lines).

A fold line 13 extends between the cuts 11 and is the line about which the snubbing end is folded in the final manufacturing operation. Longitudinally extending cuts 14 and 15 serve to form a tongue 16 which is folded transversely along the lines 16d and 16e in the direction indicated in Figure 3. The end of the tongue 16 is again folded transversely along line 16f to applicator head 16a illustrated in Figure 3. In the final assembled position, the spring section 16b formed between the transverse fold 16d and the adjacent fold 16e urges the applicator head 16a outwardly as viewed in Figure 3.

The cuts 14 and 15 thus form side plates 17 and 18 within which slits 17c, 18c are formed and which are folded along the lines 17a, 18a to lie in spaced parallel relationship to form the tape holder. The upper ends 19 and 20 of the side plates are then folded transversely and are crimped at 21 to secure the elements in assembled relationship.

Retaining flanges or tabs 22 and 23 are stamped out of the respective side plates 17 and 18 in order to hold the reel of tape material in the position illustrated in Figure 3.

The slits 11 provide finger side plates 24 and 25 which are folded along the dotted lines indicated in order that the ears 24c, 25c may be inserted into the respective slits 17c, 18c as illustrated in Figure 3.

In the operation of forming the blank 10, transverse cut 26, longitudinal cuts 27 and 28, and short transverse cuts 29 and 30 form the flange 33, the cuts 29 and 30 serving to form tabs or ears 31, 32 which are folded down to provide a sufficiently wide opening 33b in order to permit the applicator head 16a to be inserted therethrough, as illustrated in Figure 3. The cuts hereinabove mentioned thus form a flange 33 which, as illustrated in Figure 3, is bent outwardly and serves as a cradle or stop member against which the applicator head and cutting mechanism hereinafter to be described may rest as sufficient pressure is exerted upon the device during the operation of applying tape to a desired surface.

As illustrated in Figure 3, a roll of tape 34 is inserted between the side plates 17 and 18 with the retaining flanges 22 and 23 received within the core of the roll and with the extremity of the tape threaded between the applicator 16k of the applicator head 16a and the snubbing edge 26a that is formed by the cut 26. Also, as illustrated in Figure 3, the normal position of the applicator head is such that the outwardly extending end of the tape 35 is maintained against the snubbing edge 26a in order that the adhesive on the adjacent side of the tape will engage the snubber edge and thus prevent the end of the tape 35 from being withdrawn in a direction toward the roll.

All of the foregoing mechanism is described more fully in applicant's co-pending application Serial No. 307,795, filed September 4, 1952, for "Tape Holder With Snubber and Cutter Tongue," above mentioned, and the improvement of the present invention will now be described.

In this connection the material from which the blanks 10 are formed may be supplied in the form of a web of continuous blank material 37, twice the transverse width of that shown in Figure 1, so that two blanks 10 may be cut at one time as the web 37 is severed transversely at the dot-and-dash lines 37a, which indicate the locations of cuts that will sever the material into the individual blanks 10.

To the upper portion of the web material 37, as viewed in Figure 1, cutting material 38' is supplied, this cutting material being in the form of pliable metal strip staples 38 of U-shape having one edge 38a serrated or toothed to serve as the cutter for the tape 35. The upper edge of each blank 10 is notched at 16m, thereby leaving the two spaced tabs 16n. As shown especially in Figure 4, the serrated edge 38a of the staple overlaps the edge of notch 16m when the tabs 16n are folded backwardly thereover, as is shown in Figure 4. The staple 38 so positioned is crimped in place by folding its tines 38b from the dotted position shown in Figure 5 around the lateral edges of tongue 16 and down flatwise against the back surface of tongue 16, as shown by the solid lines in Figure 5. When the tongue 16 is folded along line 16p, the serrated portion 38a is positioned as shown in Figures 3 and 4.

The staples 38 are applied in this fashion by a conventional stapling head positioned over the path of movement of the blank web 37 as it is fed along through the several forming stations with the stapling mechanism operated in proper timed relation by a cam or the like to emplace the staple 38 in the manner described.

Instead of applying separate staples, the cutting material 38' may be supplied in strip form either with a continuous serrated edge or formed with spaced portions having the lower edge serrated. The cutting material 38', in any event, is applied as illustrated in Figure 6, to the web material 37 and the upper edge tabs 16n of such material folded over cutting material 38' as before. The cutting material 38' is firmly secured in the desired position by sharply folding tongue 16 around its inner edge 16q along line 16p, as illustrated in Figure 7. When the ends of the cutting material 38' projecting at either side of the tongue 16 are trimmed off, the cutting edge 38a is securely maintained in its assembled position. The cutting material 38' is sufficiently thin to permit the stamping and cutting operations necessary to form the holder as hereinabove described.

In its preferred form the present invention is embodied in or carried out with plastic material such as, for example, polystyrene or the like, which affords a highly effective snubbing action on the tape material and which is easily worked at moderately elevated temperatures. Moreover, plastics of this nature do not obtain a permanent "set" when flexed and are susceptible of much more decorativeness. The forming operations hereinabove referred to are preferably accomplished at temperatures at which the plastic material is softened. For example, the polystyrene temperatures of about 240° F. are highly effective temperatures at which to work such material.

While the invention has been described with specific reference to the accompanying drawings, it is not to be limited save as defined in the appended claims.

I claim:

1. The method of forming devices for holding, dispensing, and cutting tape, comprising supplying blank material to a working position, supplying cutting material in continuous strip form to one surface of the blank material adjacent an edge thereof, the cutting material having cutting edges formed on at least one edge thereof and at least along spaced portions of said one edge, securing the cutting material to said surface at said edge of the blank material by folding over said edge of the blank material upon the cutting material, the folded over portion of the blank material overlying a portion only of the cutting material, whereby a cutting edge of the cutting material is exposed, separating the blank material into a plurality of separate blanks, and subsequently completely folding the separate blanks into tape holding, dispensing, and cutting devices.

2. A tape holder, applicator and cutting mechanism, comprising a channel-shaped holder having sides and a bottom for receiving a roll of tape, a flexible strip extending from said bottom at an angle thereto and having an outwardly curved first portion forming an applicator head adapted to apply the tape to a desired surface and a reversely bent second portion on the applicator head lying at an angle to the first portion, the second portion having a notch formed therein, an element having a cutting edge, and mutually overlapping means on the second portion and said element to secure the last named element thereto with the cutting edge overlapping the said notch.

3. A device, according to claim 2, wherein the element having a cutting edge is secured to the second portion by a part of said second portion folded to overlie a portion of the said element spaced from the cutting edge thereon.

4. A tape holder, applicator and cutting mechanism formed of unitary plastic sheet material, comprising a holder for receiving a roll of tape, a flexible strip-like portion extending at an acute angle to the bottom of the holder and having a convexly curved first portion forming an applicator head adapted to apply the tape to a desired surface and a reversely bent second portion lying at an angle to the first portion, the second portion having a notch formed therein, a metallic strip having a cutting edge at one side thereof, and interlocking means on said strip and said second portion to secure the said strip to the said second portion with the cutting edge overlapping the said notch.

5. A tape holder, applicator and cutting mechanism formed of unitary plastic sheet material comprising a holder for receiving a roll of tape, a flexible applicator head having a first portion adapted to apply the tape to a desired surface, a second portion on the applicator head lying at an angle to the first portion, the second portion having a notch formed therein, and a staple having a cutting edge at one side thereof secured to the second portion with the cutting edge thereof overlapping the said notch.

6. A tape holder, applicator and cutting mechanism formed of unitary plastic sheet material, comprising a holder for receiving a roll of tape, a flexible applicator head having a first portion adapted to apply the tape to a desired surface, a second portion on the applicator head lying at an angle to the first portion, the second portion having a notch formed therein, a metal staple secured to the said second portion with one edge of said staple overlapping the said notch, and cutting teeth provided along said overlapping edge of the staple.

References Cited in the file of this patent

UNITED STATES PATENTS

| | | |
|---|---|---|
| 1,939,812 | Hamersley | Dec. 19, 1933 |
| 2,275,408 | Alliss | Mar. 10, 1942 |
| 2,324,204 | Fischer | July 13, 1943 |
| 2,414,915 | Ziegler | Jan. 28, 1947 |
| 2,444,117 | Sloane et al. | June 29, 1948 |
| 2,516,143 | Parsons | July 25, 1950 |
| 2,560,241 | Pangburn et al. | July 10, 1951 |
| 2,619,248 | Menge | Nov. 25, 1952 |